(12) United States Patent
Nakamura et al.

(10) Patent No.: US 8,884,190 B2
(45) Date of Patent: Nov. 11, 2014

(54) VERTICAL-POSITION WELDING METHOD

(75) Inventors: Terumi Nakamura, Tsukuba (JP); Noboru Kiji, Kure (JP); Toru Iljima, Yokohama (JP)

(73) Assignees: IHI Corporation, Tokyo (JP); National Institute for Materials Science, Ibaraki (JP)

( * ) Notice: Subject to any disclaimer, the term of this patent is extended or adjusted under 35 U.S.C. 154(b) by 1507 days.

(21) Appl. No.: 12/006,897

(22) Filed: Jan. 7, 2008

(65) Prior Publication Data

US 2008/0210677 A1    Sep. 4, 2008

(30) Foreign Application Priority Data

Jan. 18, 2007 (JP) .................................... 2007-9087

(51) Int. Cl.
*B23K 9/12* (2006.01)
*B65H 20/00* (2006.01)
*F16F 3/00* (2006.01)
*B23K 9/133* (2006.01)
*B23K 9/02* (2006.01)

(52) U.S. Cl.
CPC .............. *B23K 9/0213* (2013.01); *B23K 9/126* (2013.01); *B23K 9/133* (2013.01); *B23K 9/12* (2013.01)
USPC ....................................................... 219/137.7

(58) Field of Classification Search
USPC ........ 219/121.11, 125.1, 126, 130.51, 137 R, 219/145.21
See application file for complete search history.

(56) References Cited

U.S. PATENT DOCUMENTS

| | | | | |
|---|---|---|---|---|
| 3,582,608 A | * | 6/1971 | Ito et al. ..................... | 219/137 R |
| 4,029,933 A | * | 6/1977 | Oishi et al. .................... | 219/126 |
| 4,125,758 A | | 11/1978 | Oishi et al. | |
| 4,260,870 A | * | 4/1981 | Sekino et al. ............ | 219/124.33 |
| 4,539,460 A | * | 9/1985 | Herrmann et al. ......... | 219/73.21 |

FOREIGN PATENT DOCUMENTS

| | | |
|---|---|---|
| JP | 11-254131 | 9/1999 |
| JP | 2007069231 | 3/2007 |

* cited by examiner

*Primary Examiner* — Brian Jennison
(74) *Attorney, Agent, or Firm* — Cozen O'Connor (57) ABSTRACT

A pair of thick steel plates are set up side by side such that an I groove with a narrow gap is formed between the facing edges of the plates, and a welding wire projecting from a welding torch of an arc welding unit with a constant voltage characteristic is inserted into the I groove obliquely from above with respect to the thickness direction of the plates. The welding torch is moved vertically while the distal end of the welding wire is caused to reciprocate inside the I groove in the thickness direction. At this time, the wire feed rate Vf is varied and also the extension L of the welding wire is increased or decreased so as to keep welding current Iw at a target value. Further, the wire feed rate Vf is subjected to incremental/decremental correction according to the moving direction of the torch.

4 Claims, 6 Drawing Sheets

DEPOSITED METAL

VERTICAL-POSITION WELDING METHOD

BACKGROUND OF THE INVENTION

1. Field of the Invention

The present invention relates to a vertical-position welding method, and more particularly, to a welding technique for welding butted edges of a pair of thick steel plates together in a vertical position.

2. Description of the Related Art

In shipbuilding sites or bridge construction sites, a vertical-position welding method is generally adopted in which butted edges of a pair of steel plates are welded together by a welder in a vertical position.

As such vertical-position welding, an electrogas arc welding method has been known in which a pair of steel plates are welded together by a single welding pass in the width direction of the plates (see Unexamined Japanese Patent Publication No. H11-254131 and "Patent Maps Classified by Technical Fields" from the Japan Patent Office, Machinery 3: Arc Welding Technology, 1.3.6 Electrogas Arc Welding Method).

Also, as common welding methods, multi-layer welding is known wherein a pair of steel plates are welded together by multiple passes of MAG or MIG welding in the width direction of the plates.

Meanwhile, as a result of the recent tendency toward larger-scale steel structures used in ships, bridges and the like, steel plates with greater thickness have come to be used.

In the case of using the electrogas arc welding, which essentially requires large heat input, to weld such thick steel plates, the heat input needs to be increased to an even higher level. Consequently, a wider region of the weld deteriorates in performance, giving rise to a problem that the weld fails to retain sufficiently high toughness, that is, mechanical strength.

Thus, to permit the electrogas arc welding to be applied to thick steel plates, attempts have been made to use steel products specially prepared for large heat-input welding, as such thick steel plates, thereby ensuring high mechanical strength.

However, the use of steel products specially prepared for large heat-input welding leads to substantial increase in costs and is not desirable.

The multi-layer welding method using MAG or MIG welding does not require large heat input and thus can be suitably applied to ordinary steel plates. Since the groove generally used in steel structures is a single V groove, however, the cross-sectional area of the groove is large, requiring much time for the construction of steel structures and significantly lowering the productivity.

SUMMARY OF THE INVENTION

The present invention was made to solve the above problems, and an object thereof is to provide a vertical-position welding method which can be applied to thick steel plates while restraining increase in costs, which requires only small heat input, thereby ensuring high mechanical strength, and which thus enables efficient and high-quality welding.

To achieve the object, the present invention provides a vertical-position welding method for carrying out arc welding by using an arc welding unit with a constant voltage characteristic. The vertical-position welding method comprises the steps of: setting up a pair of thick steel plates side by side such that an I-groove with a predetermined narrow gap is formed between mutually facing edges of the thick steel plates; positioning a welding torch of the arc welding unit for feeding a welding wire such that only the welding wire projecting from the welding torch is inserted into the I-groove obliquely from above with respect to a thickness direction of the thick steel plates; moving the welding torch up and down along the thick steel plates and reciprocating a distal end of the welding wire in the thickness direction of the thick steel plates by varying a wire feed rate and also increasing and decreasing a length of extension of the welding wire from the welding torch such that a welding current remains at a target value, to deposit metal inside the I-groove; and controlling position of the distal end of the welding wire to an appropriate position in accordance with a moving direction of the welding torch when the distal end of the welding wire is reciprocated in the thickness direction of the thick steel plates.

With the vertical-position welding method of the present invention, the gap of the I-groove can be narrowed; hence the required heat input can be reduced to a significantly low level despite the large plate thickness, compared with the conventional electrogas arc welding method in which welding is completed by one pass in the thickness direction of the plates. Consequently, it is unnecessary to use special steel products prepared specially for large heat-input welding, thus reducing costs. Also, fluctuation of the welding current from the target value is prevented to restrain variation in arc length, and accordingly, stable and high-quality welding can be efficiently performed while at the same time ensuring mechanical strength equivalent to that achieved by the conventional electrogas arc welding, whereby fracture toughness especially at low temperatures can be remarkably improved.

BRIEF DESCRIPTION OF THE DRAWINGS

The present invention will become more fully understood from the detailed description given hereinafter and the accompanying drawings which are given by way of illustration only, and thus, are not limitative of the present invention, and wherein.

DETAILED DESCRIPTION OF THE PREFERRED EMBODIMENT

An embodiment of the present invention will be described below with reference to the accompanying drawings.

Figure 1:
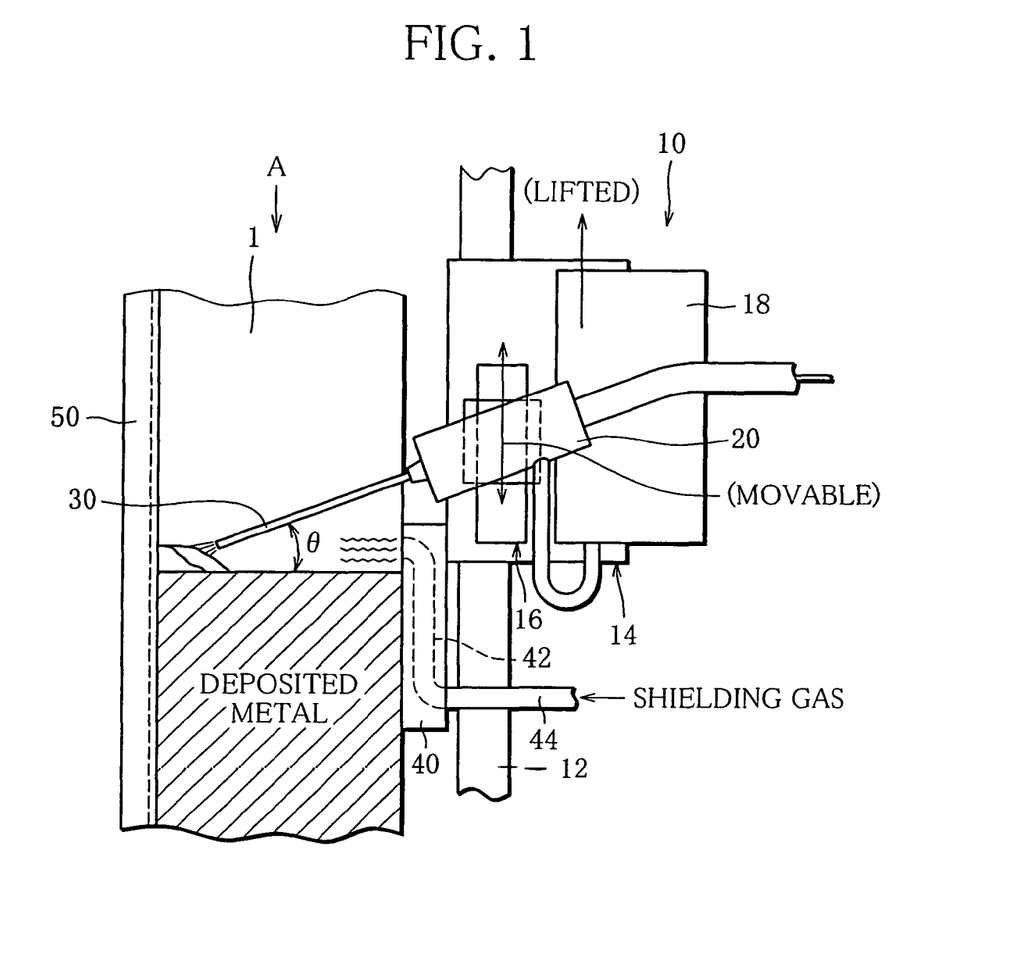
FIG. 1 is a partly sectional side view showing a thick steel plate and an automatic welding unit to which a vertical-position welding method according to the present invention is applied.
Figure 2:
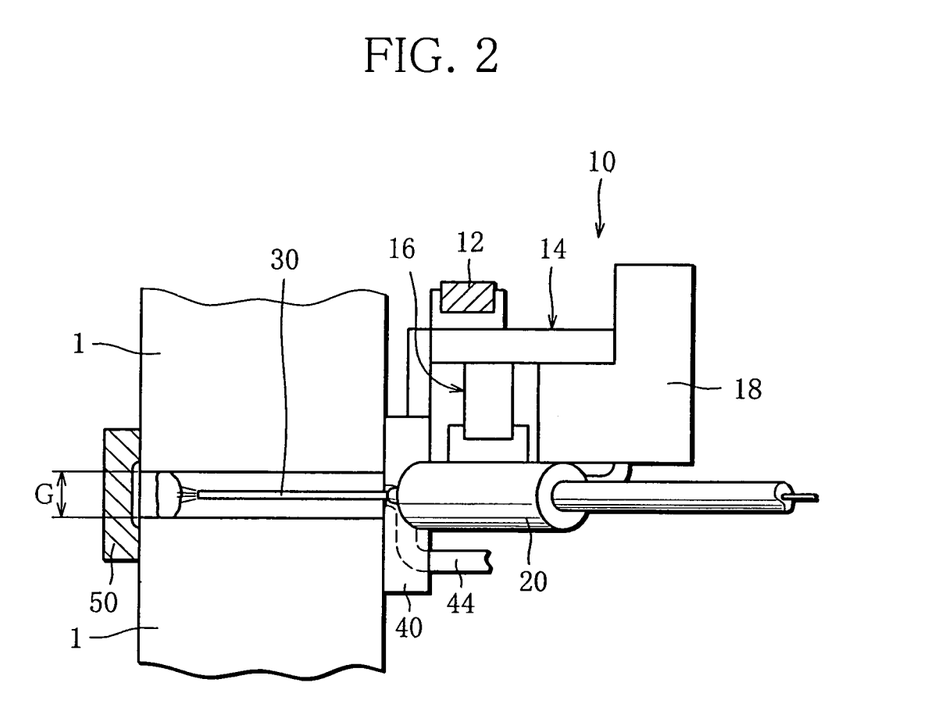
FIG. 2 is a top view of the automatic welding unit and steel plates as viewed from direction A in FIG. 1.

FIGS. 1 and 2 illustrate a state in which a pair of thick steel plates 1 are being welded together by an automatic arc welding unit 10 to which a vertical-position welding method of the present invention is applied. Specifically, the thick steel plates 1 are set up side by side such that an I-groove with a gap G (predetermined narrow gap) is formed between the mutually facing edges thereof. The automatic welding unit 10 is provided with a welding torch 20 for feeding a welding wire 30. FIG. 1 shows the automatic welding unit 10 with its welding wire 30 inserted into the I-groove between the thick steel plates 1, and deposited metal, in section, deposited inside the I-groove. FIG. 2 shows the thick steel plates 1 and the automatic welding unit 10 as viewed from direction A in FIG. 1.

The thick steel plates 1 are plates of steel with a large thickness, like the ones used in large-scale steel structures such as ships and bridges. In this embodiment, steel plates with a large thickness (e.g., 20 mm or more) are used which require such a large heat input to be welded by the conventional electrogas arc welding that sufficiently high mechanical strength cannot be ensured because of deterioration in performance of the weld.

The welding wire 30 alone is inserted into the gap G of the I-groove formed between the thick steel plates 1. Accordingly, the groove gap G is set to a small value slightly greater than the outside diameter $\phi$ (e.g., 1.2 mm or 1.6 mm) of the welding wire 30 (e.g., G=7 to 10 mm where $\phi$ is 1.2 mm, or G=8 to 12 mm where $\phi$ is 1.6 mm).

The automatic welding unit 10, which uses an ordinary constant-voltage power source, comprises a rail 12 extending vertically along the thick steel plates 1 and a traveling unit 14 movable along the rail 12. The welding torch 20 is mounted on the traveling unit 14.

The welding torch 20 is connected through a welding wire feeder to a welding wire coil (neither of which is shown). The welding wire 30 is fed to the welding torch 20 such that a distal end portion thereof is always projected from the welding torch 20.

Also, the welding torch 20 is inclined at a predetermined angle $\theta$ (e.g., 10° to 45°) with respect to the thickness direction (horizontal direction) of the steel plates so that the welding wire 30 being fed may be inserted obliquely from above into the I-groove. The welding torch 20 is also configured so as to be vertically movable relative to a slide unit 16.

In this manner, the welding wire 30 is inserted into the I-groove at the predetermined angle $\theta$ and also the welding torch 20 is vertically movable. Accordingly, the distal end of the welding wire 30 can be made to reciprocate in the thickness direction of the thick steel plates 1 at least over a distance greater than the plate thickness by vertically moving the welding torch 20 on the slide unit 16 and at the same time increasing and decreasing the extension of the welding wire 30 projecting from the welding torch 20, without moving the welding torch 20 in the thickness direction (horizontal direction) at all.

Namely, by configuring the welding torch 20 such that the welding torch 20 is inclined at the predetermined angle $\theta$ with respect to the thickness direction (horizontal direction) of the steel plates and also is vertically movable, it is possible to carry out welding operation with only the welding wire 30 kept inserted into the I-groove with the small gap G. It is therefore unnecessary to make the welding torch 20 especially slender in shape.

The traveling unit 14 has a patch plate 40 located close to the steel plates 1, and a shielding gas passage 42 is formed inside the patch plate 40 to supply a shielding gas (carbonic acid gas, MAG gas or the like) to the welding region. The shielding gas passage 42 has an inlet connected with a gas hose 44 to be supplied with the shielding gas from a gas source (not shown) through the hose 44. The shielding gas thus supplied to the shielding gas passage 42 is released from its outlet to the welding region. For the patch plate 40, a heat-resistant member (e.g., ceramic plate) is used.

In the illustrated example, the shielding gas is supplied through the shielding gas passage 42 formed inside the patch plate 40. Alternatively, such a shielding gas passage may be formed inside the welding torch 20 so that the shielding gas may be supplied from the welding torch 20, as in conventional equipment.

Further, a welding controller 18 is mounted on the traveling unit 14. The welding controller 18 performs various control actions necessary for the arc welding, such as the current control, the control of feeding of the welding wire by means of the wire feeder, the control of supply of the shielding gas, the control of up-down movement of the welding torch 20 on the slide unit 16, and the control of lifting of the traveling unit 14 along the rail 12.

In FIGS. 1 and 2, reference numeral 50 denotes a back patch plate for closing the opening of the I-groove remote from the automatic welding unit 10 to prevent outflow of the deposited metal. Like the patch plate 40, a heat-resistant member (e.g., ceramic plate) is used as the back patch plate 50. Although not shown, the bottom opening of the I-groove is usually closed with another thick steel plate 1 or with deposited metal.

In the following, the vertical-position welding method according to the present invention will be explained.

Figure 3:
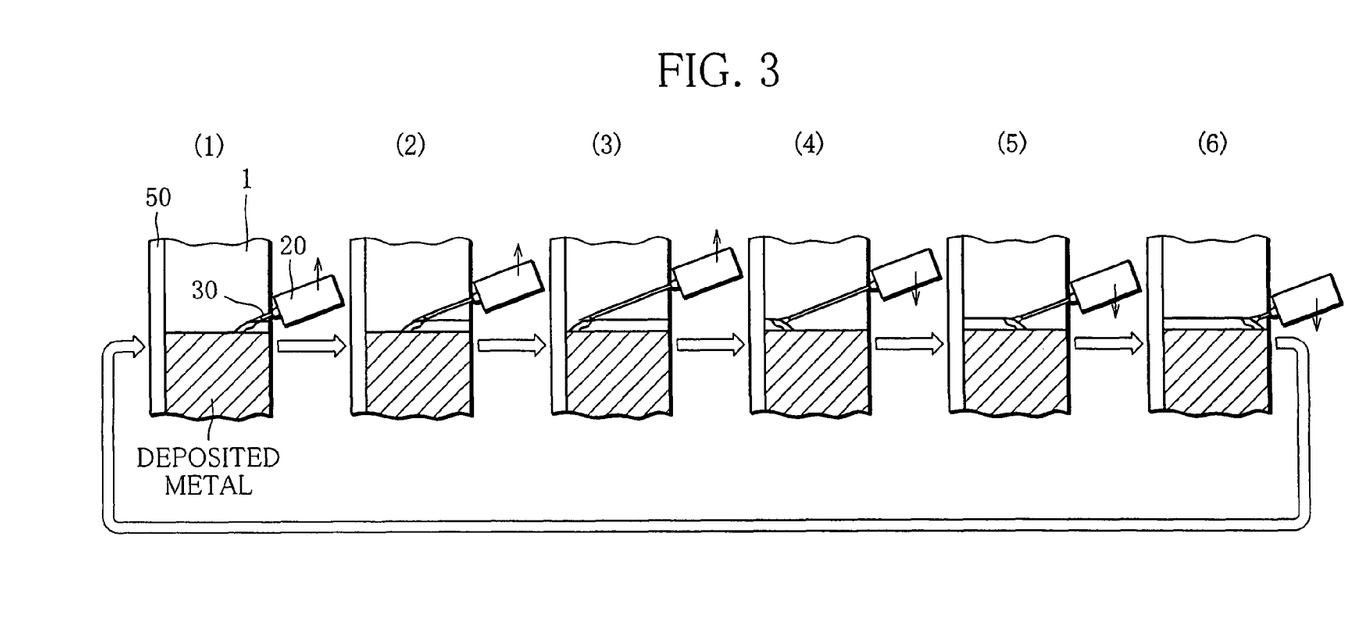
FIG. 3 illustrates a welding procedure according to the vertical-position welding method of the present invention.
Figure 4A:
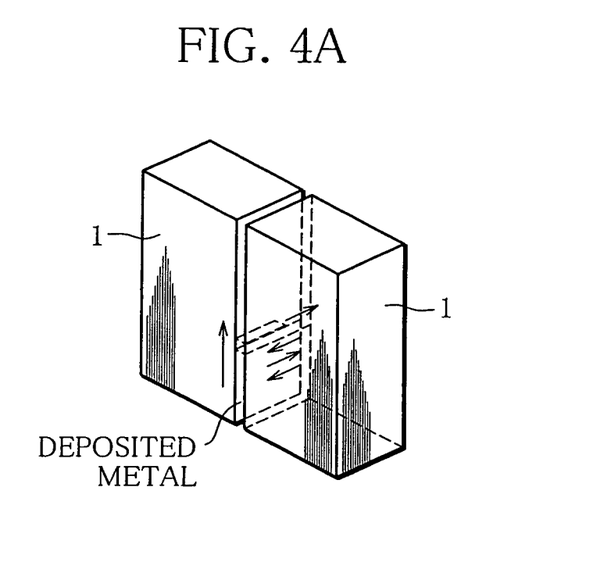
FIGS. 4(a) and 4(b) are conceptual diagrams illustrating the vertical-position welding method.
Figure 4B:
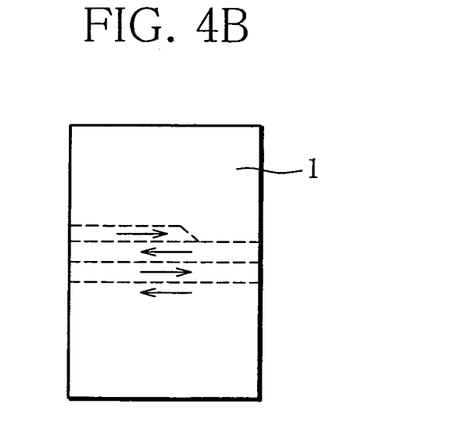

FIG. 3 illustrates a time-series welding procedure (1)-(6) according to the vertical-position welding method of the present invention, and FIGS. 4(*a*) and 4(*b*) are a perspective view and a front view, respectively, of the thick steel plates, also illustrating the vertical-position welding method. Referring to FIGS. 3 and 4 as well as to FIGS. 1 and 2, the vertical-position welding method of the present invention will be described.

First, the thick steel plates 1 are set up side by side such that an I-groove with the gap G is formed between the steel plates 1. Also, the automatic welding unit 10 and the back patch plate 40 are set in position, and the distal end portion of the welding wire 30 projecting from the welding torch 20 is inserted into the I-groove, as shown in FIGS. 1 and 2.

Then, with current and voltage values set in advance so as to match the outside diameter $\phi$ of the welding wire 30 (e.g., 120 to 350 A and 25 to 40 V where the outside diameter $\phi$ is 1.2 mm; 160 to 500 A and 27 to 45 V where the outside diameter $\phi$ is 1.6 mm), current control is started by the welding controller 18 to begin welding from the vicinity of the lowermost end of the opening of the I-groove close to the automatic welding unit 10. Namely, an arc discharge from the distal end of the welding wire 30 to the thick steel plates 1 is produced to initiate arc welding (corresponding to (1) in FIG. 3). As a result, the welding wire 30 and the mutually facing edges of the thick steel plates 1 begin to melt, so that the metals are deposited inside the I-groove.

Upon start of the arc welding, the welding torch 20 is controlled by the welding controller 18 so as to move up and down on the slide unit 16 (in FIG. 1, indicated by double-headed arrow). More specifically, at this stage, the welding torch 20 is moved upward at a fixed speed (e.g., in the range of 5 to 150 cm/min) and at the same time the length of extension of the welding wire 30 from the welding torch 20 is increased while making use of the self-restoration of arc length attained by the constant-voltage characteristic of the automatic welding unit 10, so that the distal end of the welding wire 30 moves (moves forward) away from the automatic welding unit 10 (corresponding to (2) in FIG. 3).

Meanwhile, it has been known that the relationship indicated below holds among the welding current Iw at the distal end of the welding wire 30, the extension L of the welding wire 30, and the melting rate Vm of the welding wire 30 (see Welding Journal, Vol. 37, No. 8, pp. 343-353 (1958), "Control of Melting Rate and Metal Transfer in Gas-shielded Metal-Arc Welding, Part 1, Control of Electrode Melting Rate" by A. Lesnewich).

$$Vm = a \cdot Iw + b \cdot L \cdot Iw^2 \quad (1)$$

where "a" and "b" are constants suitably set based on experiments or the like.

Equation (1) shows that in the case of ordinary welding in which the extension L of the welding wire 30 is kept unchanged, the penetration distribution in the thickness direction of the steel plates, that is, the melting rate Vm of the welding wire 30 can be stabilized by determining a target value for the welding current Iw so as to restrain variation in the arc length, thereby achieving high weld quality. Specifically, the welding current Iw is set at a fixed value, for example, to keep the arc length almost constant, thereby achieving a uniform penetration distribution in the thickness direction, namely, a constant melting rate Vm of the welding wire 30, and thus stable high weld quality.

Also, in ordinary welding wherein the extension L of the welding wire 30 is kept unchanged, the melting rate Vm of the wire 30 can be regarded as equivalent to the wire feed rate Vf of the wire 30.

Thus, also in cases where the extension L of the welding wire 30 is varied as mentioned above, the welding current Iw should desirably be set at a fixed value, for example, to keep the arc length almost constant, in order to achieve stable and high weld quality. In this embodiment, the melting rate Vm, namely, the wire feed rate Vf is variably controlled on the basis of Equation (1) and the relationship between the melting rate Vm and the wire feed rate Vf so that the welding current Iw may remain fixed.

Specifically, the melting rate Vm, namely, the wire feed rate Vf is increased with increase in the extension L, according to Equation (1), so that the welding current Iw may be kept fixed.

Figure 5A:
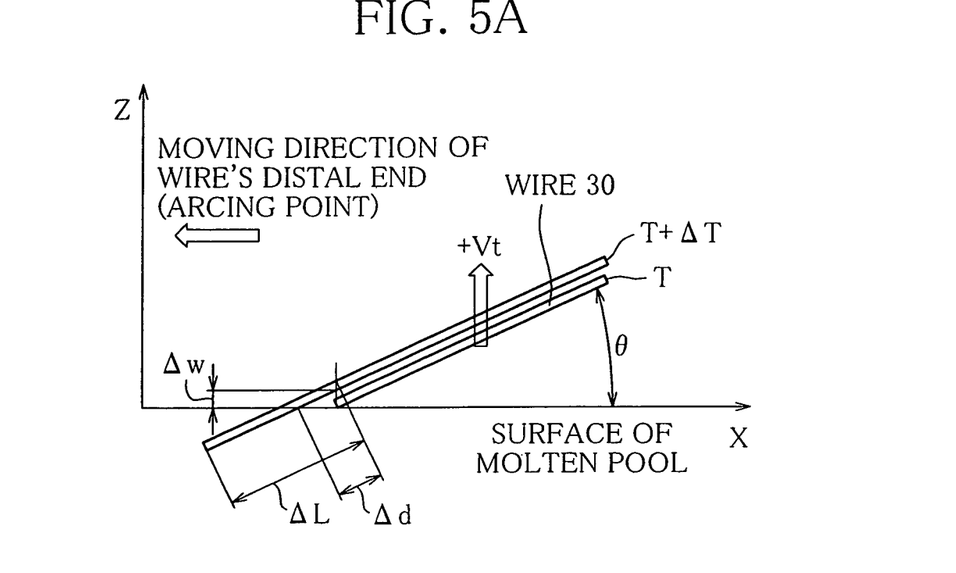
FIGS. 5(a) and 5(b) are schematic diagrams showing the relationship between an increment $\Delta L$ in extension of a welding wire during a very short period $\Delta T$ after a time T and a deviation $\Delta d$ of the wire extension caused relative to the surface of a molten pool for geometrical reasons as a result of the ascent or descent of a welding torch.

In the case of the illustrated welding unit, however, increasing the wire feed rate Vf with increase in the wire extension L is not enough. In actual operation, the welding torch 20 is moved upward on the slide unit 16 at a fixed speed, and therefore, the wire feed rate Vf becomes deficient by an amount corresponding to the ascending speed of the welding torch 20. FIG. 5(a) illustrates the case where the welding torch 20 is moved upward on the slide unit 16 at a fixed speed Vt (+Vt) while the welding wire 30 is fed at the rate Vf, and schematically shows the relationship between an increment ΔL in the extension of the welding wire 30 during a very short period ΔT from a time T to a time (T+ΔT) and a deviation Δd (Δd=Δw/sinθ; Δw=Vt·ΔT) of the wire extension caused relative to the surface of a molten pool for geometrical reasons as a result of the ascent of the welding torch 20 at the fixed speed Vt. As shown in the figure, the wire extension becomes deficient because the deviation Δd, which does not contribute to the welding, takes up a portion of the increment ΔL in the extension, giving rise to a problem that the necessary extension increment ΔL for stable welding is not secured.

Accordingly, in this embodiment, a wire feed rate (Vt/sinθ) corresponding to the ascending speed Vt of the welding torch 20 is added to the wire feed rate Vf of the wire 30 based on Equation (1), as indicated by Equation (2) below, to correct the melting rate Vm, namely, the wire feed rate Vf, of the welding wire 30.

$$Vm = Vf + \alpha \cdot Vt/\sin\theta \quad (2)$$

where α is a constant (e.g., 0.5 to 1.0) suitably set based on experiments or the like.

As a consequence, the welding current Iw can be set at a fixed value and thus the arc length can satisfactorily be kept almost constant, irrespective of the ascent of the welding torch 20, whereby stable and high weld quality is ensured.

With the movement of the welding torch 20 controlled in the aforementioned manner, the distal end of the welding wire 30 is thereafter moved away from the automatic welding unit 10 until it reaches the vicinity of the opening of the I-groove remote from the welding unit 10. After a layer of deposited metal is formed in the remotest region of the I-groove (corresponding to (3) in FIG. 3), the welding torch 20 is then moved downward at a fixed speed (e.g., in the range of 5 to 150 cm/min) and at the same time the length of extension of the welding wire 30 from the welding torch 20 is decreased while making use of the self-restoration of the arc length attained by the constant voltage characteristic of the welding unit 10, so that the distal end of the welding wire 30 moves (moves backward) toward the automatic welding unit 10 (corresponding to (4) and (5) in FIG. 3). Also in this case, the wire feed rate of the wire 30 is variably controlled so that the welding current may be kept fixed.

Specifically, the melting rate Vm, namely, the wire feed rate Vf of the wire 30 is reduced with decrease in the extension L of the welding wire 30 so that the welding current Iw may be kept fixed in accordance with Equation (1) above, and further, the melting rate Vm, namely, the wire feed rate Vf is corrected by using a wire feed rate (Vt/sinθ) corresponding to the descending speed of the welding torch 20.

Figure 5B:
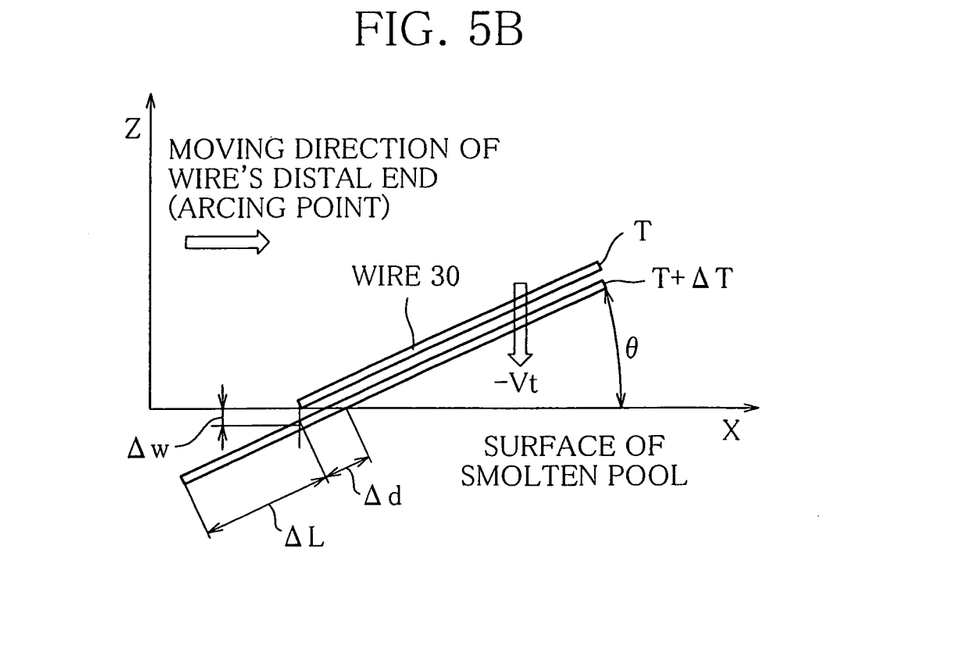

FIG. 5(b) illustrates the case where the welding torch 20 is moved downward on the slide unit 16 at the fixed speed (−Vt) while the welding wire 30 is fed at the wire feed rate Vf, and schematically shows the relationship between an increment ΔL in the extension of the welding wire 30 during a very short period ΔT from a time T to a time (T+ΔT) and a deviation Δd (Δd=Δw/sinθ; Δw=Vt·ΔT) of the wire extension caused relative to the surface of the molten pool for geometrical reasons as a result of the descent of the welding torch 20 at the fixed speed Vt. As shown in the figure, when the welding torch 20 is moved downward, the extension of the welding wire 30 becomes too long because the deviation Δd, in addition to the extension increment ΔL, contributes to the welding.

Accordingly, in this case, the wire feed rate (Vt/sinθ) corresponding to the descending speed Vt of the welding torch 20 is subtracted from the wire feed rate Vf based on Equation (1), as indicated by Equation (3) below, to correct the melting rate Vm, namely, the wire feed rate Vf, of the welding wire 30.

$$Vm = Vf - \beta \cdot Vt/\sin\theta \quad (3)$$

where β is a constant (e.g., 0.5 to 1.0) suitably set based on experiments or the like and may be equal to α in Equation (2) above.

Consequently, the welding current Iw can be set at a fixed value and thus the arc length can be kept almost constant, regardless of the descent of the welding torch 20, whereby stable and high weld quality is ensured.

While the distal end of the welding wire 30 reciprocates (moves forward and then backward) in the I-groove, the traveling unit 14, along with the welding torch 20, is lifted along the rail 12 by an amount corresponding to the thickness of two layers of deposited metal formed by the two passes of the welding wire 30. Specifically, the traveling unit 14 is controlled by the welding controller 18 so as to continuously move upward (in FIG. 1, indicated by arrow) along the rail 12 at a speed corresponding to the thickness of metal being deposited (e.g., at 2 to 8 cm/min where the outside diameter φ of the welding wire 30 is 1.2 mm, or at 2 to 10 cm/min where the outside diameter φ is 1.6 mm). Alternatively, the traveling unit 14 may be controlled so as to lift intermittently.

The distal end of the welding wire 30 is moved forward and backward with the movement of the welding torch 20 controlled in the aforementioned manner, and when the opening of the I-groove close to the automatic welding unit 10 is reached (corresponding to (6) in FIG. 3), the above sequence of operations is repeated thereafter, as indicated by arrows in FIGS. 4(a) and 4(b). As a result, the deposited metal is successively accumulated in the I-groove until the welding is completed.

Figure 6:
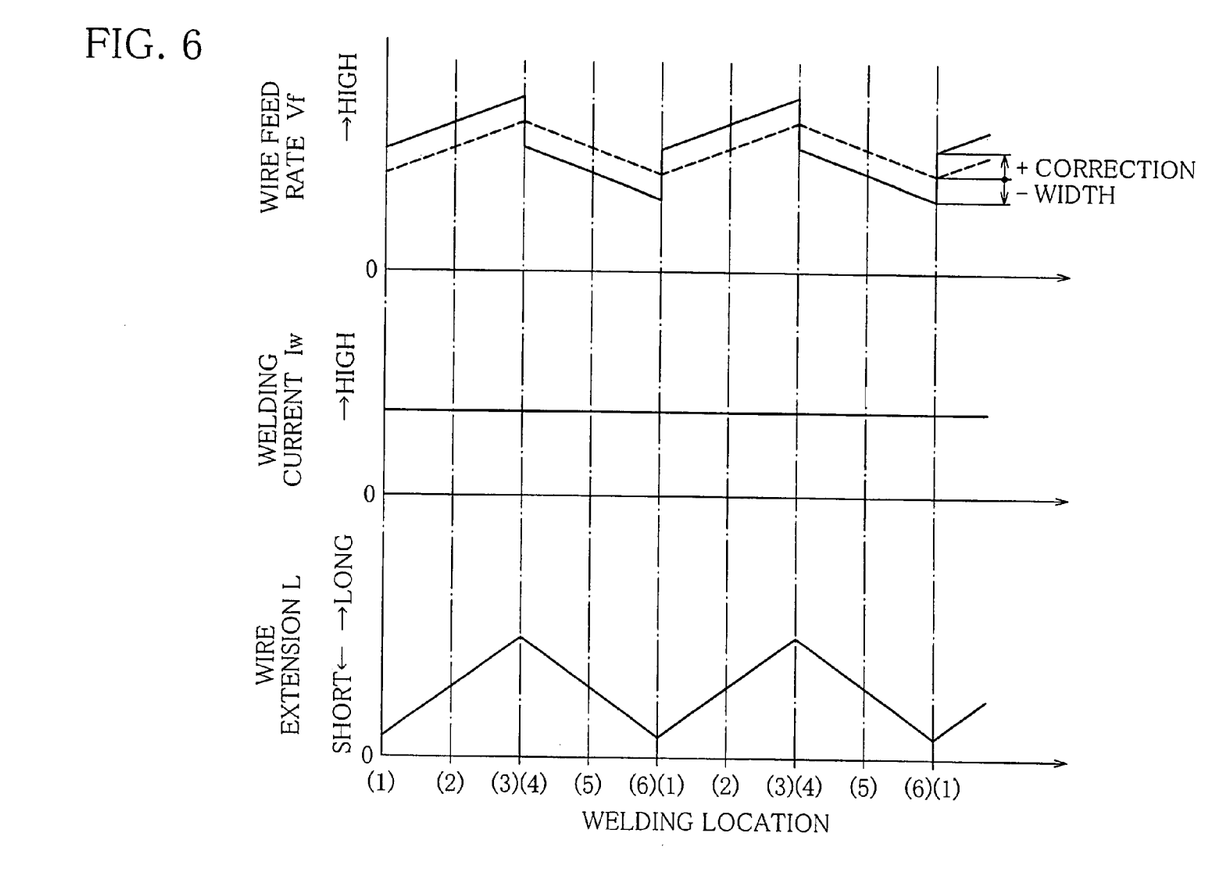
FIG. 6 shows the relationship of the wire feed rate, the welding current, and the wire extension according to the present invention.

FIG. 6 shows the wire feed rate Vf of the wire 30, the welding current Iw and the wire extension L, all by solid lines, with reference to respective welding locations ((1) to (6) in FIG. 3) in the case where the wire feed rate is variably controlled and is also corrected in accordance with the up-down movement of the welding torch 20. In the figure, the broken line indicates, by way of comparison, the wire feed rate which is variably controlled but not corrected according to the up-down movement of the welding torch 20. By variably controlling the wire feed rate and also correcting the wire feed rate in accordance with the up-down movement of the welding torch 20, it is possible to satisfactorily prevent fluctuation of the welding current and thus to keep the arc length almost constant, regardless of changes in the extension of the welding wire 30, whereby stable and high weld quality can be achieved.

As described above, where the thick steel plates 1 are welded together by the vertical-position welding method of the present invention, the steel plates 1 are set up side by side such that an I-groove with the smallest possible gap G is formed therebetween, and only the welding wire 30 projecting from the welding torch 20 is inserted into the I-groove. Then, flat-position welding is repeated while moving the welding torch 20 up and down, without moving the torch 20 in a horizontal direction. In this case, the welding current Iw is kept at a fixed value and also the wire feed rate Vf of the wire 30 is corrected in accordance with the up-down movement of the welding torch 20.

With the vertical-position welding method of the present invention, therefore, the gap G of the I-groove can be narrowed, and because of this, the required heat input can be reduced to a significantly low level (about 1/10 or less), compared with the conventional electrogas arc welding method in which welding is completed by one pass in the thickness direction of plates, despite the large plate thickness. Consequently, it is unnecessary to use, as the thick steel plates 1, special steel products prepared specially for large heat-input welding, thus reducing costs, and yet it is possible to efficiently build a welded structure with mechanical strength equivalent to that achieved by the conventional electrogas arc welding as well as with stable and high weld quality. Thus, large-scale steel structures remarkably improved in fracture toughness at low temperatures can be constructed.

While the preferred embodiment of the present invention has been described, it is to be noted that the present invention is not limited to the foregoing embodiment alone and may be modified in various ways without departing from the scope of the invention.

For example, in the above embodiment, the target value of the welding current Iw is set at a fixed value to keep the arc length almost constant. Alternatively, the target value of the welding current Iw may be variably set as the case may be, insofar as stable and high weld quality is ensured.

What is claimed is:

1. A vertical-position welding method for carrying out arc welding using an arc welding unit with a constant voltage characteristic, comprising the steps of:
    setting up a pair of thick steel plates side by side such that an I-groove with a predetermined narrow gap is formed between mutually facing edges of the thick steel plates;
    positioning a welding torch of the arc welding unit for feeding a welding wire such that only the welding wire projecting from the welding torch is inserted into the I-groove obliquely from above with respect to a thickness direction of the thick steel plates;
    moving the welding torch up and down along the thick steel plates and reciprocating a distal end of the welding wire in the thickness direction of the thick steel plates by varying a wire feed rate and also increasing and decreasing a length of extension of the welding wire from the welding torch such that a welding current remains at a target value, to deposit metal inside the I-groove; and
    controlling a position of the distal end of the welding wire by subjecting the wire feed rate to incremental/decremental correction in accordance with a moving direction of the welding torch when the distal end of the welding wire is reciprocated in the thickness direction of the thick steel plates,
    wherein, when the distal end of the welding wire is moved forward in the thickness direction of the thick steel plates toward an opening of the I-groove remote from the arc welding unit, the wire feed rate is subjected to the incremental correction in accordance with an ascending speed of the welding torch, the incremental correction being executed according to:

$$V_m = V_f + \alpha V_t / \sin\theta$$

where $V_m$ is a melting rate of the welding wire, $V_f$ is the wire feed rate, $V_t$ is the ascending speed of the welding torch, θ is an angle between the welding wire and the thickness direction of the thick steel plates, and α is a constant in a range of about 0.5 to 1.0, and
    when the distal end of the welding wire is moved backward in the thickness direction of the thick steel plates toward another opening of the I-groove close to the arc welding unit, the wire feed rate is subjected to the decremental correction in accordance with a descending speed of the welding torch, the decremental correction being executed according to:

$$V_m = V_f - \beta V_t / \sin\theta$$

where $V_m$ is the melting rate of the welding wire, $V_f$ is the wire feed rate, $V_t$ is the descending speed of the welding torch, θ is an angle between the welding wire and the thickness direction of the thick steel plates, and β is a constant in a range of about 0.5 to 1.0.

2. The vertical-position welding method according to claim 1, wherein the length of extension of the welding wire from the welding torch is increased or decreased while the wire feed rate is varied such that the welding current remains fixed to keep an arc length constant.

3. The vertical-position welding method according to claim 1, wherein the predetermined narrow gap of the I-groove is 15 mm or less.

4. The vertical-position welding method according to claim 1, wherein the pair of thick steel plates each have a plate thickness of 20 mm or more.

* * * * *